(12) United States Patent
Wang

(10) Patent No.: US 8,065,952 B2
(45) Date of Patent: Nov. 29, 2011

(54) FULL-AUTOMATIC DRIP COFFEE MAKER WITH COFFEE BEAN GRINDER

(75) Inventor: Dong-lei Wang, Zhuhai (CN)

(73) Assignees: Vesta Electrical Appliance, Changmingshui Village, Wuguishan Town; Manufacturing (Zhongshan) Co., Ltd., Zhongshan City, Guangdon Province (CN)

( * ) Notice: Subject to any disclaimer, the term of this patent is extended or adjusted under 35 U.S.C. 154(b) by 517 days.

(21) Appl. No.: 12/332,131

(22) Filed: Dec. 10, 2008

(65) Prior Publication Data

US 2009/0173236 A1    Jul. 9, 2009

(30) Foreign Application Priority Data

Jan. 9, 2008    (CN) ...................... 2008 2 0042634 U

(51) Int. Cl.
*A47J 31/42*    (2006.01)
(52) U.S. Cl. .............. 99/280; 99/286; 99/289 R; 99/304
(58) Field of Classification Search ..................... 99/280, 99/286, 289 R, 290, 300, 304; *A47J 31/42*
See application file for complete search history.

(56) References Cited

U.S. PATENT DOCUMENTS

| | | | | |
|---|---|---|---|---|
| 3,682,090 A | * | 8/1972 | Meriggi | 99/289 R |
| 4,172,413 A | * | 10/1979 | Roseberry | 99/286 |
| 4,555,984 A | * | 12/1985 | Yamashita | 99/286 |
| 4,913,037 A | * | 4/1990 | Newnan | 99/286 |
| 5,224,414 A | * | 7/1993 | Hunt | 99/286 |
| 5,285,705 A | * | 2/1994 | Buttle et al. | 99/286 |
| 5,511,465 A | * | 4/1996 | Friedrich et al. | 99/286 |
| 6,827,002 B1 | * | 12/2004 | Lin | 99/286 |
| 7,252,033 B1 | * | 8/2007 | Lin | 99/286 |
| 2005/0120885 A1 | * | 6/2005 | Wang | 99/279 |

FOREIGN PATENT DOCUMENTS

WO    WO 2007106947 A1 *    9/2007

* cited by examiner

*Primary Examiner* — Stephen F Gerrity
(74) *Attorney, Agent, or Firm* — Colin P. Cahoon; Celina M. Orr; Carstens & Cahoon, LLP

(57) ABSTRACT

A full-automatic drip coffee maker with coffee bean grinder which is totally electronic controlled, that is, the user just needs to select whether to brew coffee after grinding the coffee bean or directly brew coffee on the control panel, accordingly the coffee maker will carry out operations automatically and preserve the coffee bean aroma as much as possible in the process of brewing. It comprises a shell body, an automatic coffee bean grinding device, a brewing device, a heater, a water reservoir, a control panel and a coffee pot; a coffee powder outlet is disposed below the automatic coffee bean grinding device, the brewing device comprises a coffee basket for holding coffee powder, the coffee basket is disposed below the coffee powder outlet, and the coffee pot is disposed below the coffee outlet of the brewing device; wherein the automatic coffee bean grinding device further comprises a partition sealing assembly, and the partition scaling assembly comprises a partition device disposed below the coffee powder outlet and a drive motor for the partition device; the partition device is connected with the shaft of the drive motor so as to rotate around the shaft of the drive motor.

18 Claims, 10 Drawing Sheets

FULL-AUTOMATIC DRIP COFFEE MAKER WITH COFFEE BEAN GRINDER

FIELD OF THE INVENTION

The present invention relates to an appliance for brewing coffee beverage, more particularly, to a full-automatic drip coffee maker with coffee bean grinder.

BACKGROUND OF THE INVENTION

In prior art, the full-automatic drip coffee maker with coffee bean grinder is quite popular for its convenience and utility. Compared with a coffee center which incorporates a coffee bean grinder with an espresso coffee device, the drip coffee maker with coffee bean grinder has an absolute advantage in production cost, on the other hand, many consumers are still used to traditional flavour of brewed coffee, therefore the drip coffee maker with coffee bean grinder has significance for both traders and consumers. However, there always exist some problems annoying the developer of drip coffee maker with coffee bean grinder, the first problem is how to reduce the time interval during which the coffee powder is exposed in air in order to preserve the coffee bean aroma as much as possible; the second problem is how to effectively prevent water steam from coffee basket from entering into coffee powder passage when brewing coffee, so as to prevent the coffee powder from getting lumped or even unable to be discharged therefrom; the above mentioned two problems are always encountered when developing this kind of coffee maker, more particularly, the seal of coffee powder passage of the second problem is always difficult to be overcome when developing drip coffee maker with coffee bean grinder. To use a drip coffee maker with coffee bean grinder which is sold in current market, the user should at first manually move the coffee basket or the drip device in order to get ready for grinding, and then after grinding, the user has to move the coffee basket or the drip device again in order to get ready for brewing until the coffee is brewed ready. The above mentioned operation requires the user to rotate or move the coffee basket or the drip device at first, which is more complex than the traditional operation, and the user may easily forget to do it which causes inconvenience in use.

SUMMARY OF THE INVENTION

The present invention aims at providing a full-automatic drip coffee maker with coffee bean grinder, which is totally electronic controlled, that is, the user just needs to select whether to brew coffee after grinding the coffee bean or directly brew coffee on the control panel, accordingly the coffer maker will carry out operations automatically and preserve the coffee bean aroma as much as possible in the process of brewing.

The goal of the present invention is achieved by the following technical scheme:

A full-automatic drip coffee maker with coffee bean grinder comprises a shell body, an automatic coffee bean grinding device which is disposed on the shell body, a brewing device which is in connection with the automatic coffee bean grinding device, a water reservoir, a cover of said water reservoir, a water outgoing pipe and a water incoming pipe which are connected with said water reservoir respectively, a heater for heating the cold water inside said water reservoir, a spray device for spraying coffee, a control panel which is disposed on the outside of the shell body, and a coffee pot for holding coffee which is disposed partly or totally inside the shell body and can be put in and out easily; a coffee powder outlet is disposed below said automatic coffee bean grinding device, said brewing device comprises a coffee basket for holding coffee powder, said coffee basket is disposed below the coffee powder outlet, and said coffee pot is disposed below the coffee outlet of the brewing device; the automatic coffee bean grinding device further comprises a partition sealing assembly, and said partition sealing assembly comprises a partition device disposed below the coffee powder outlet and a drive motor for partition device; said partition device is connected with the shaft of the drive motor so as to rotate around the shaft of the drive motor; said partition device has two working positions: when it is at the first working position, the coffee powder outlet is not covered by the partition device so that the coffee powder outlet communicates with the coffee basket; when it is at the second working position, the partition device rests against and right beneath the coffee powder outlet so that the coffee powder outlet is barriered from the coffee basket.

Said partition device comprises a shift member and a partition plate; said partition sealing assembly further comprises a switch which can start the automatic coffee bean grinding device and a switch which can start the brewing device; said two switches are respectively disposed on the two sides of the shift member of the partition device; when said partition device is at the first working position, the shift member of the partition device is connected with the switch so as to start the automatic coffee bean grinding device; when said partition device is at the second working position, the shift member of the partition device is connected with the switch so as to start the brewing device.

Of the partition sealing assembly, said switch which can start the automatic coffee bean grinding device is normally closed, and said switch which can start the brewing device is normally closed.

An upper sealing ring is disposed in the clearance formed between said partition device and the coffee powder outlet.

A lower sealing ring is disposed in the clearance formed between said partition device and the coffee basket.

In summary, the present invention has the following advantages: by employing a partition sealing assembly with a drive motor for partition device, a full-automatic drip coffee maker with coffee bean grinder of the present invention can realize two functions according to user's selections, that is, to brew coffee after grinding coffee bean or brew coffee directly with grinding coffee bean, which are enabled by opening and closing of the coffee powder outlet by the partition device which is driven by the drive motor for partition device. The sealing rings and the partition device work as double barriers, which ensures the water steam can not enter into the coffee powder passage when brewing coffee. The shift member of partition device is used for turning on and off the two switches, the two switches are connected with a control chip, and the movement of the motor is controlled by the state of the switches and the function selected by the user. The present invention employs the motor, switches in collaboration with the partition device, and uses a control chip to detect the opening and closing of the switch so as to control the movement of the motor, therefore, the opening and closing of the coffee powder outlet is controlled by the partition device, which realizes the full automatic function of the drip coffee maker with coffee bean grinder. Meanwhile, all operations are completed automatically inside the machine; therefore, coffee powder will not be exposed in air when the coffee powder falls down into the coffee basket from the coffee powder passage, which preserves the coffee bean aroma as much as possible.

Figure 1:
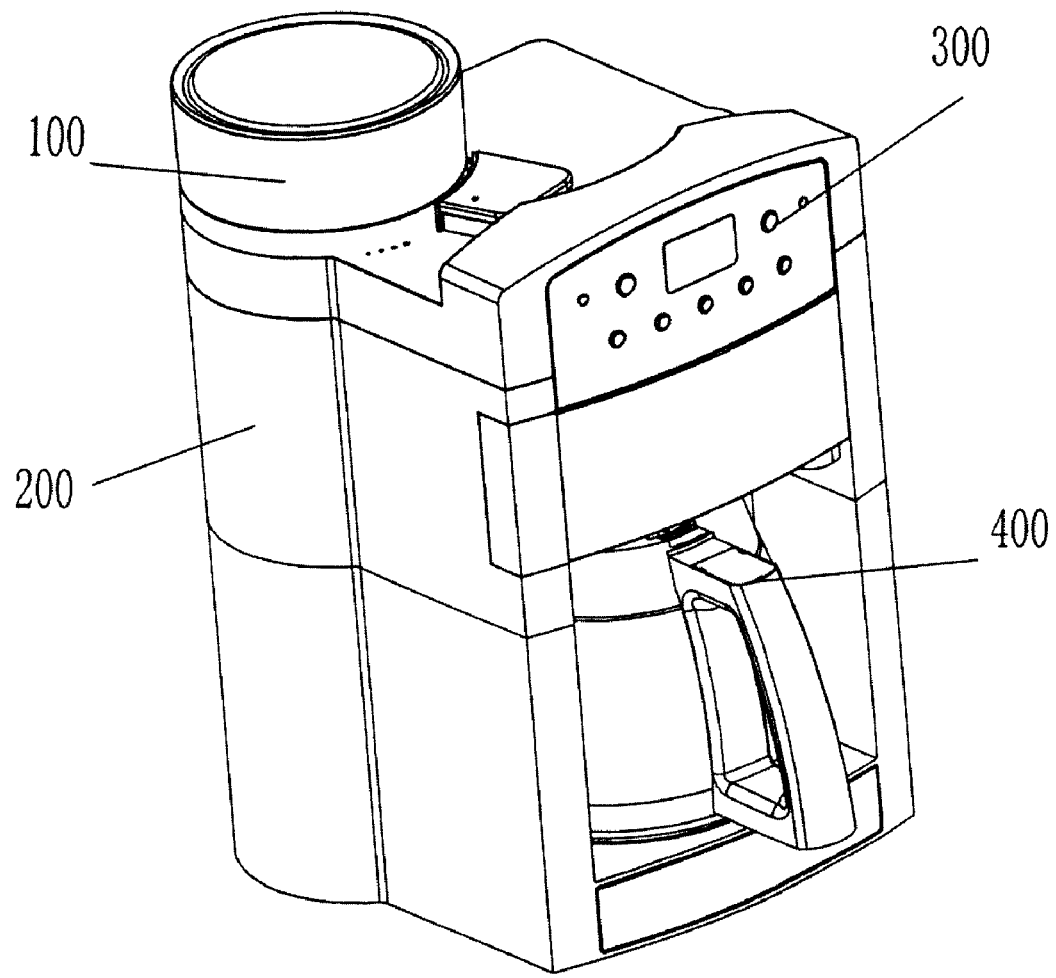
FIG. 1 is a schematic outside view of the full-automatic drip coffee maker with coffee bean grinder of the present invention.

in which: 2 denotes a switch; 3 denotes a switch; 4 denotes coffee powder passage; 5 denotes coffee powder outlet; 6 denotes an upper sealing ring, 7 denotes a lower sealing ring; 8 denotes a motor for grinding coffee bean; 9 denotes a coffee basket; 10 denotes a shift member of partition device; 11 denotes a partition plate of partition device; 14 denotes a water incoming pipe; 15 denotes a spray device; 18 denotes a water reservoir; 19 denotes a cover of the water reservoir; 20 denotes a drive motor for partition device; 30 denotes an assembling plate; 100 denotes an automatic coffee bean grinding device; 200 denotes a shell body; 300 denotes a control panel; 400 denotes a coffee pot.

DETAILED DESCRIPTION OF THE PREFERRED EMBODIMENTS

As illustrated in FIGS. 1-13, a full-automatic drip coffee maker with coffee bean grinder of the present invention comprises a shell body 200, an automatic coffee bean grinding device 100 which is disposed on the shell body 200, a brewing device which is in connection with the automatic coffee bean grinding device 100, a water reservoir 18, a cover 19 of said water reservoir 18, a water outgoing pipe (not shown) and a water incoming pipe 14 which are connected with said water reservoir 18 respectively, a heater (not shown) for heating the cold water inside said water reservoir 18, a spray device 15 for spraying coffee, a control panel 300 which is disposed on the outside of the shell body 200, and a coffee pot 400 for holding coffee which is disposed partly or totally inside the shell body 200 and can be put in and out easily; a coffee powder outlet 5 is disposed below said automatic coffee bean grinding device 100, said brewing device comprises a coffee basket 9 for holding coffee powder, said coffee basket 9 is disposed below the coffee powder outlet 5, and said coffee pot 400 is disposed below the coffee outlet of the brewing device; the automatic coffee bean grinding device 100 further comprises a partition sealing assembly, and said partition sealing assembly comprises a partition device disposed below the coffee powder outlet 5 and a drive motor 20 for partition device; said partition device is connected with the shaft of the drive motor 20 so as to rotate around the shaft of the drive motor; said partition device has two working positions: when it is at the first working position, the coffee powder outlet 5 is not covered by the partition device so that the coffee powder outlet 5 communicates with the coffee basket 9; when it is at the second working position, the partition device rests against and right beneath the coffee powder outlet 5 so that the coffee powder outlet 5 is barriered from the coffee basket 9.

The water reservoir 18 can be disposed on the left, right or rear side of the shell body 200, the cover 19 of the water reservoir 18 can be disposed in way of flip-opening or pull-out opening, the water outgoing pipe and water-incoming pipe 14 which are connected with the water reservoir 18 can be hidden inside the water reservoir 18 or outside the water reservoir 18, the heater can be disposed at the bottom of the shell body 200 or on the side of the shell body 200, the spray device 15 can be disposed in front of the coffee powder outlet 5 or at the rear of the coffee powder outlet 5 or surrounding the coffee powder outlet 5. The water reservoir is mainly used for reserving water; water can be added into the water reservoir 18 by opening the cover 19 of the water reservoir 18, then the water in the water reservoir 18 is transferred via the water outgoing pipe to be heated by the heater so as to reach a certain temperature and pressure and then transferred via the water incoming pipe 14 to the spray device 15 so as to spray the coffee in the coffee basket 9.

Said partition device comprises a shift member 10 and a partition plate 11; said partition sealing assembly further comprises a switch 2 which can start the automatic coffee bean grinding device and a switch 3 which can start the brewing device; said two switches 2, 3 are respectively disposed on the two sides of the shift member 10 of the partition device; when said partition device is at the first working position, the shift member 10 of the partition device is connected with the switch 2 so as to start the automatic coffee bean grinding device; when said partition device is at the second working position, the shift member 10 of the partition device is connected with the switch 3 so as to start the brewing device.

Of the partition sealing assembly, said switch 2 which can start the automatic coffee bean grinding device is normally closed, and said switch 3 which can start the brewing device is normally closed.

An upper sealing ring 6 is disposed in the clearance formed between said partition device and the coffee powder outlet 5.

A lower sealing ring 7 is disposed in the clearance, formed between said partition device and the coffee basket 9.

First Embodiment

Figure 2:
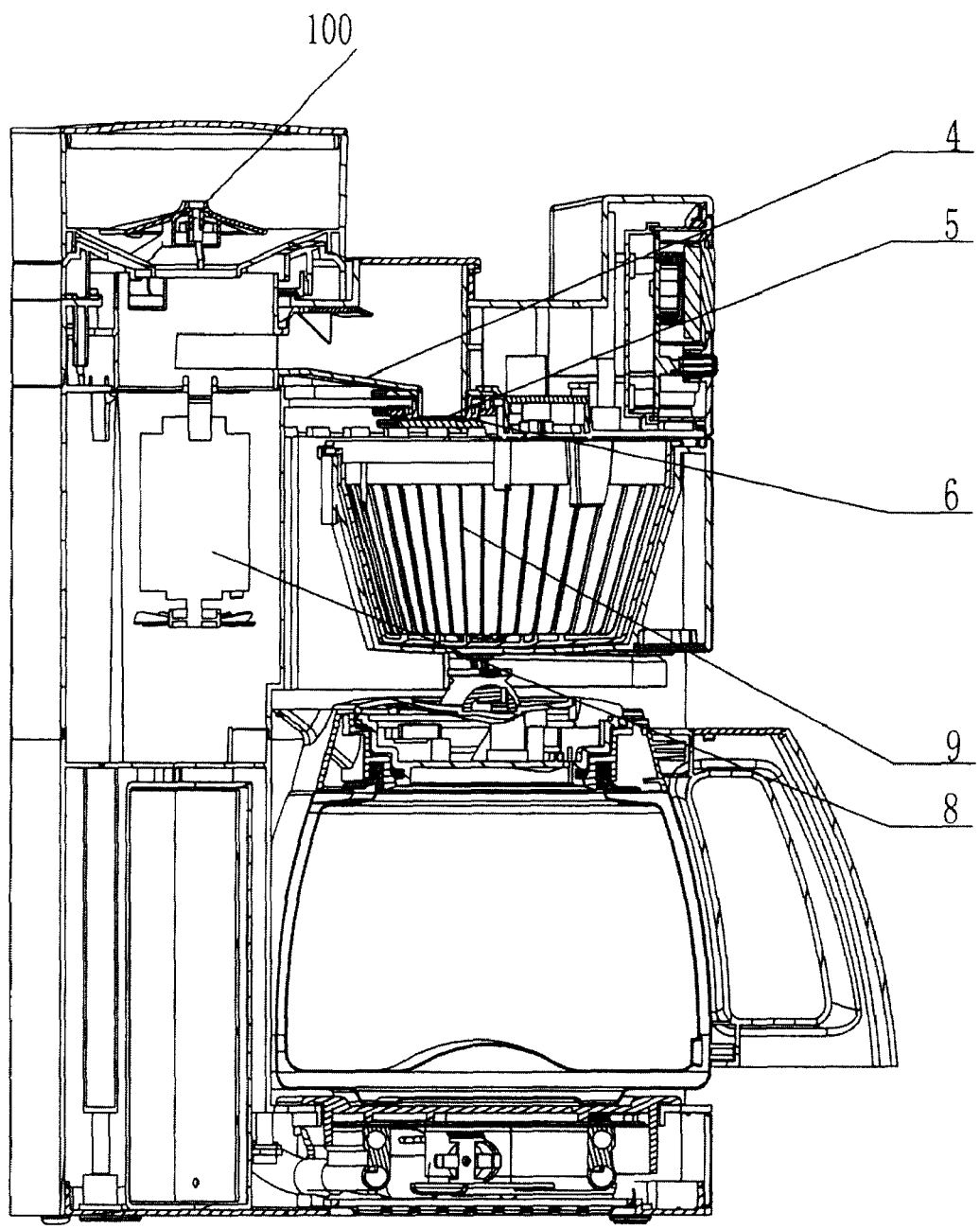
FIG. 2 is a side structural view of the partition sealing assembly of the full-automatic drip coffee maker with coffee bean grinder according to the first embodiment of the present invention.
Figure 3:
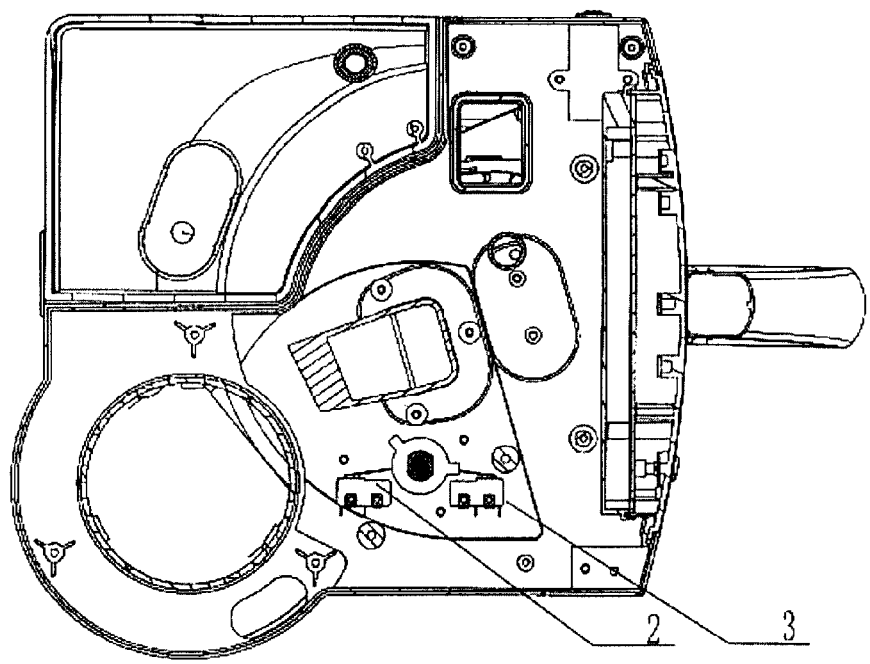
FIG. 3 is a top structural view of the partition sealing assembly of the full-automatic drip coffee maker with coffee bean grinder according to the first embodiment of the present invention.
Figure 5:
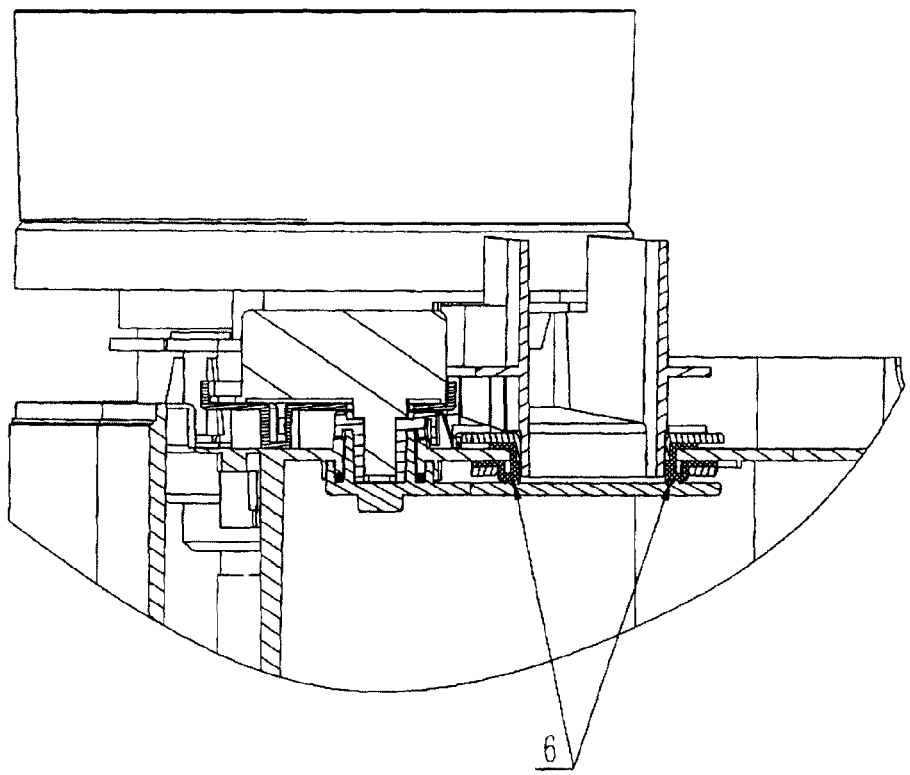
FIG. 5 is a cross-sectional view showing the structure of the partition sealing assembly of the full-automatic drip coffee maker with coffee bean grinder according to the first embodiment of the present invention.

As illustrated in FIGS. 2, 3 and 5, in this embodiment, the automatic coffee bean grinding device 100 comprises a coffee powder discharge device, and said coffee powder discharge device comprises a coffee powder passage 4, and the end of the coffee powder passage 4 forms a coffee powder outlet 5, the grinded coffee powder is transferred through the coffee powder passage 4 to the coffee powder outlet and then falls down into the coffee basket 9. Said upper sealing ring 6 is disposed on the coffee powder passage 4 and between the coffee powder outlet 5 and the partition plate 11 of partition device in order to prevent water steam from entering into the coffee powder passage when brewing coffee.

Figure 4:
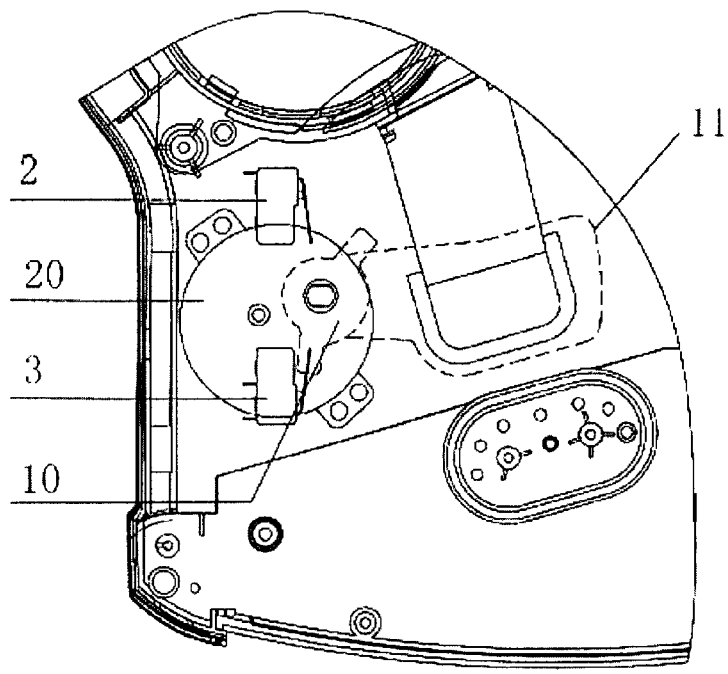
FIG. 4 is a partial enlarged view of FIG. 3.
Figure 6:
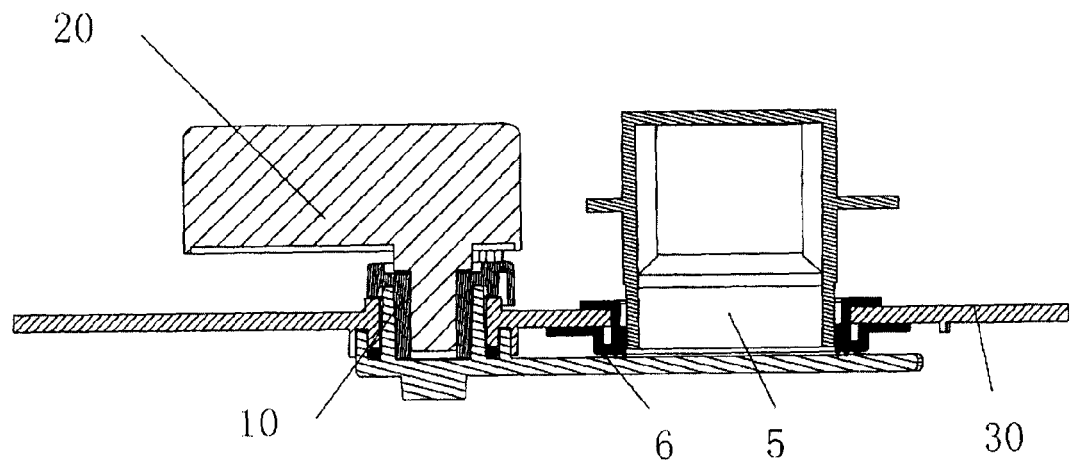
FIG. 6 is an assembly structural view of the partition sealing assembly of the full-automatic drip coffee maker with coffee bean grinder according to the first embodiment of the present invention.
Figure 7:
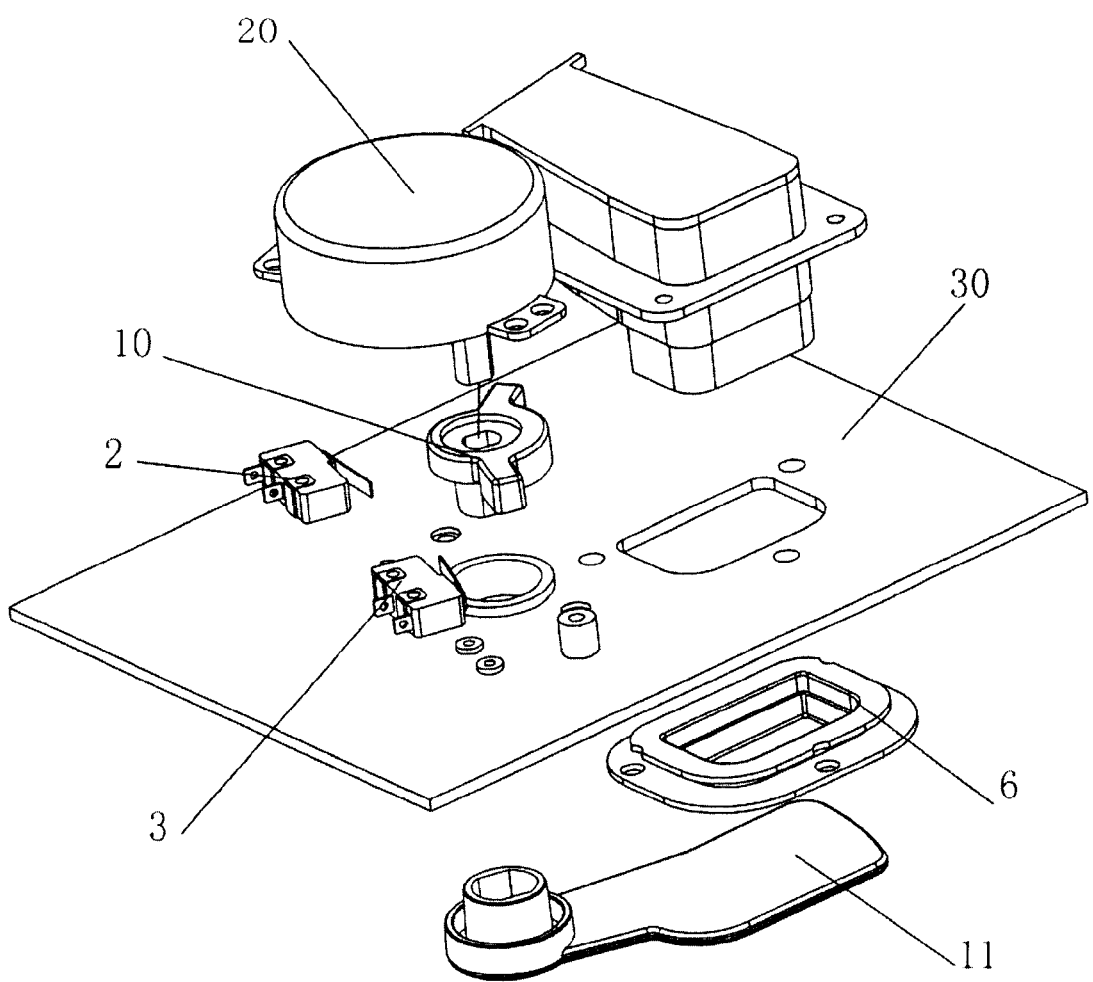
FIG. 7 is an exploded structural view of the partition sealing assembly of the full-automatic drip coffee maker with coffee bean grinder according to the first embodiment of the present invention.
Figure 8:
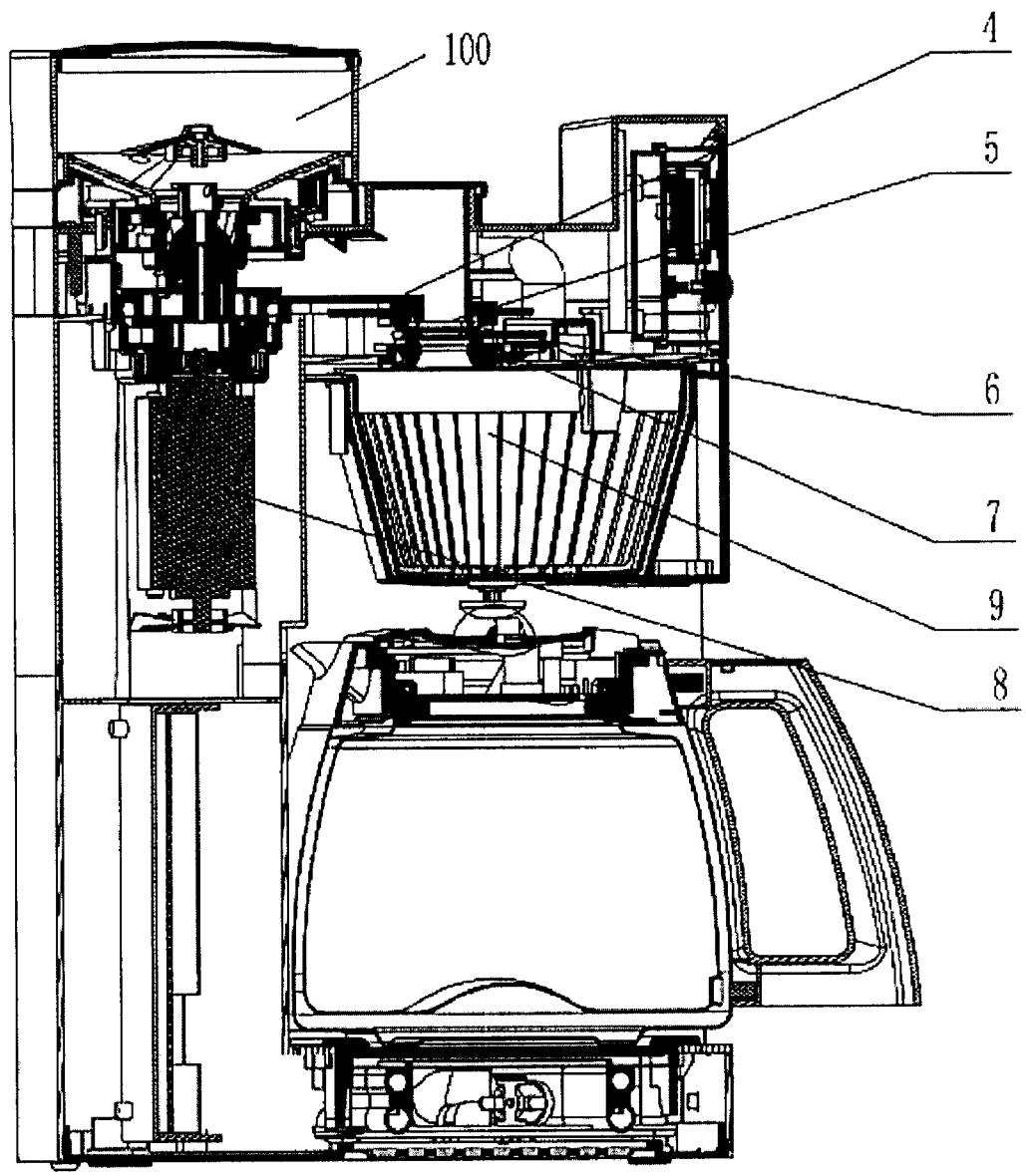
FIG. 8 is a side structural view of the partition sealing assembly of the full-automatic drip coffee maker with coffee bean grinder according to the second embodiment of the present invention.
Figure 9:
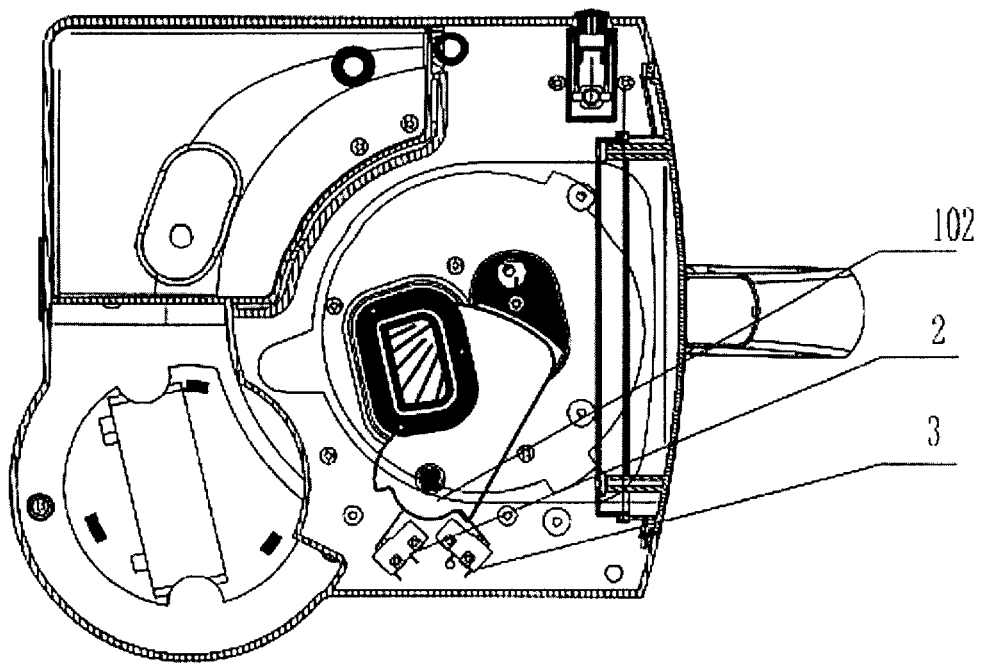
FIG. 9 is a top structural view of the partition sealing assembly of the full-automatic drip coffee maker with coffee bean grinder according to the second embodiment of the present invention.
Figure 10:
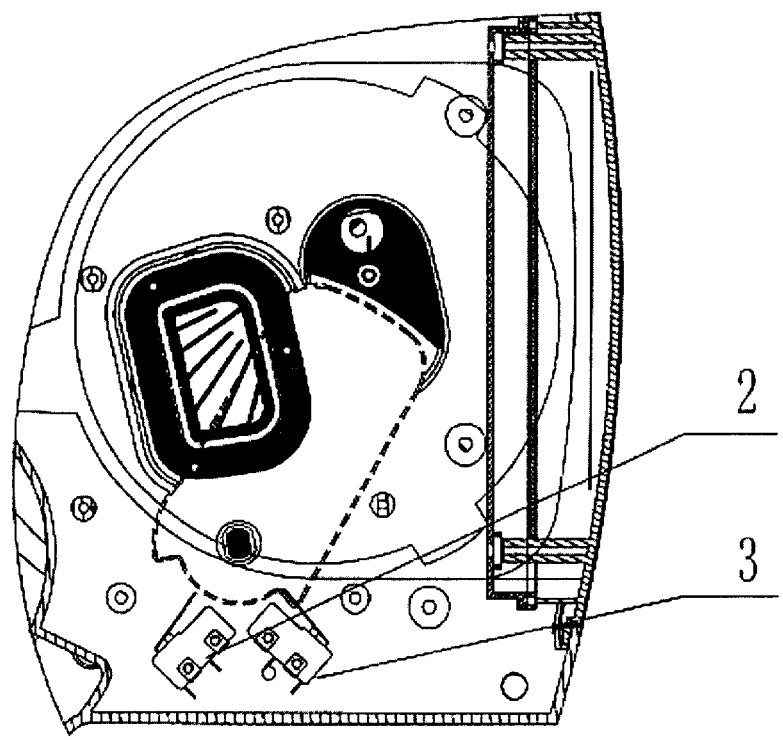
FIG. 10 is a partial enlarged view of FIG. 9.
Figure 11:
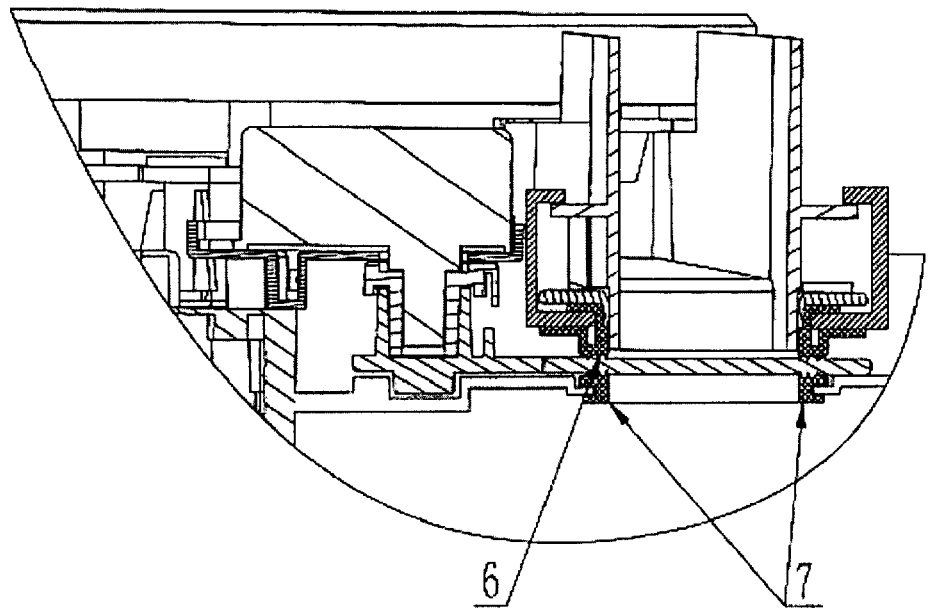
FIG. 11 is a cross-sectional view showing the structure of the partition sealing assembly of the full-automatic drip coffee maker with coffee bean grinder according to the second embodiment of the present invention.
Figure 12:
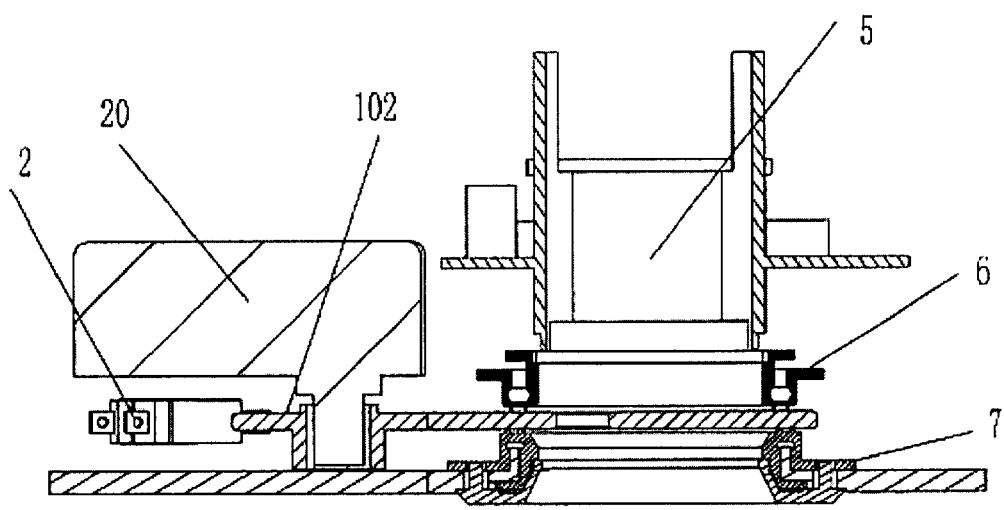
FIG. 12 is an assembly structural view of the partition sealing assembly of the full-automatic drip coffee maker with coffee bean grinder according to the second embodiment of the present invention.

As illustrated in FIGS. 4, 6 and 7, the partition device consists of two parts of an upper part and a lower part; the upper part forms a shift member 10 which is used for turning on and off the switches 2, 3, the lower part forms a partition plate 11 which is used for opening and closing the coffee powder outlet, and said shift member 10 and partition plate 11 are two independent parts which are detachable.

Said shift member 10 of partition device comprises two ear-shaped bulges which are used for contacting the switches 2, 3, the partition plate 11 is a flat plate and has a knife-shaped orthographic projection as viewed from up to down; an assembling plate 30 is disposed between the coffee powder outlet 5 and the coffee basket 9, said switches 2, 3 and the shift member 10 of partition device are assembled on the upper surface of the assembling plate 30; the partition plate 11 of partition device is assembled on the lower surface of the assembling plate 30; said shift member 10 of partition device and the partition plate 11 of partition device are connected integrally by a sleeve passing through the assembling plate 30; the shift member 10 of partition device has a central through hole, and the shaft of the drive motor for partition device is inserted into the central through hole of the shift member 10 of partition device.

The assembling plate 30 has a through hole which conforms to the coffee powder outlet 5 in shape and size, and the coffee powder outlet 5 passes through the assembling plate 30 to be fastened with the upper sealing ring 6.

If the user selects the function of brewing coffee after grinding coffee bean, there are two instances, if the switch 2 is turned on by the shift member of partition device, the partition plate of partition device will correspondingly rotate to the position to uncover the coffee powder outlet; if the switch 2 is off, the shift member of the partition device will be driven by the drive motor for partition device to rotate until the switch 2 is turned on by the shift member of partition device, and accordingly the coffee powder outlet is opened. When the switch 2 is turned on and the coffee powder outlet is opened, the coffee bean grinding device begins to grind coffee bean according to instructions from the control chip, the grinded coffee powder is transferred through the coffee powder passage to the coffee powder outlet and then falls down into the coffee basket in below. When the process of grinding coffee bean is finished, the control chip detects that the switch 3 is off, then the shift member of partition device is driven by the drive motor for partition device to rotate until the switch 3 is turned on, in the meantime, the partition plate of partition device rotates to the position to cover the coffee powder outlet, the process of brewing coffee begins when the control chip detects that the switch 3 is turned on. If the user selects the function of directly brewing coffee without grinding coffee bean, the machine will skip the process of grinding coffee bean and directly go into the process of brewing coffee, and the control chip directly detects the state of the switch 3, if the switch 3 is turned on, then directly brewing coffee; if the switch 3 is off, then the shift member of partition device is driven by the drive motor for partition device to rotate to the position to turn on the switch 3, in the meantime, the partition plate of partition device covers the coffee powder outlet.

In the process of brewing coffee, because of two barriers of the partition device and the sealing ring between the coffee basket and the coffee powder outlet of the coffee powder passage, the water steam from the coffee basket is not able to enter into the coffee powder passage and will not cause the remaining coffee powder to get lumped.

In use, the user only needs to select grinding coffee bean first or directly brewing coffee, then the control chip will control the corresponding components of the machine to do the rest of work, which realizes the full automatic function of the drip coffee maker with coffee bean grinder.

Second Embodiment

As illustrated in FIGS. 8, 9, 10, 11 and 12, in this embodiment, the partition device is an integral plate, the left side of the partition device is a shift section 102 which is used for turning on and off the two switches, and the right side of the partition device is a partition section 112 which is used for opening and closing the coffee powder outlet. A lower sealing ring 7 is disposed between the partition device and the coffee basket, which helps to ensure keeping the water steam from entering into the coffee powder passage and the inside of the machine.

The lower sealing ring 7, the partition section 112 of partition device and the upper sealing ring 6 are respectively disposed above the coffee basket 9; as compared with the first embodiment, the second embodiment further employs the lower sealing ring 7 so as to enable three barriers between the coffee basket and the coffee powder outlet, meanwhile the lower sealing ring 7 helps to prevent water steam from the coffee basket from entering into other components of the machine.

The shift section 102 of partition device is in shape of an oval with two notches.

Figure 13:
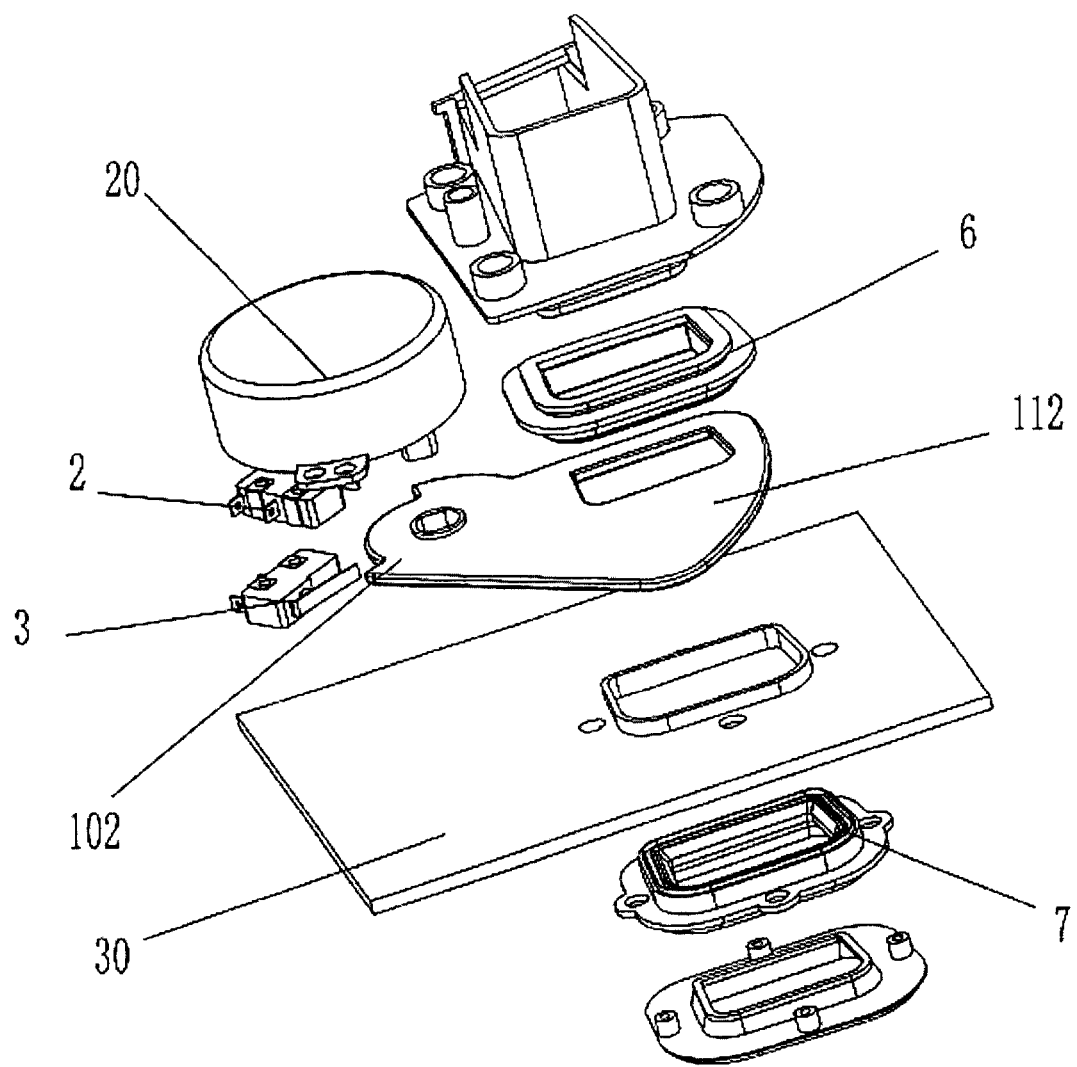
FIG. 13 is an exploded structural view of the partition sealing assembly of the full-automatic drip coffee maker with coffee bean grinder according to the second embodiment of the present invention.

As illustrated in FIG. 13, an assembling plate 30 is disposed between the coffee powder outlet 5 and the coffee basket 9, said switches 2, 3 and partition device are respectively assembled on the upper surface of the assembling plate 30; the shift section 102 of partition device has a central through hole, and the shaft of the drive motor for partition device is inserted into the central through hole of the shift section 102 of partition device; the assembling plate 30 has a through hole which conforms to the coffee powder outlet 5 in shape and size, and the coffee powder outlet 5 passes through the upper sealing ring 6 and the assembling plate 30 to be fastened with the lower sealing ring 7.

Figure 14:
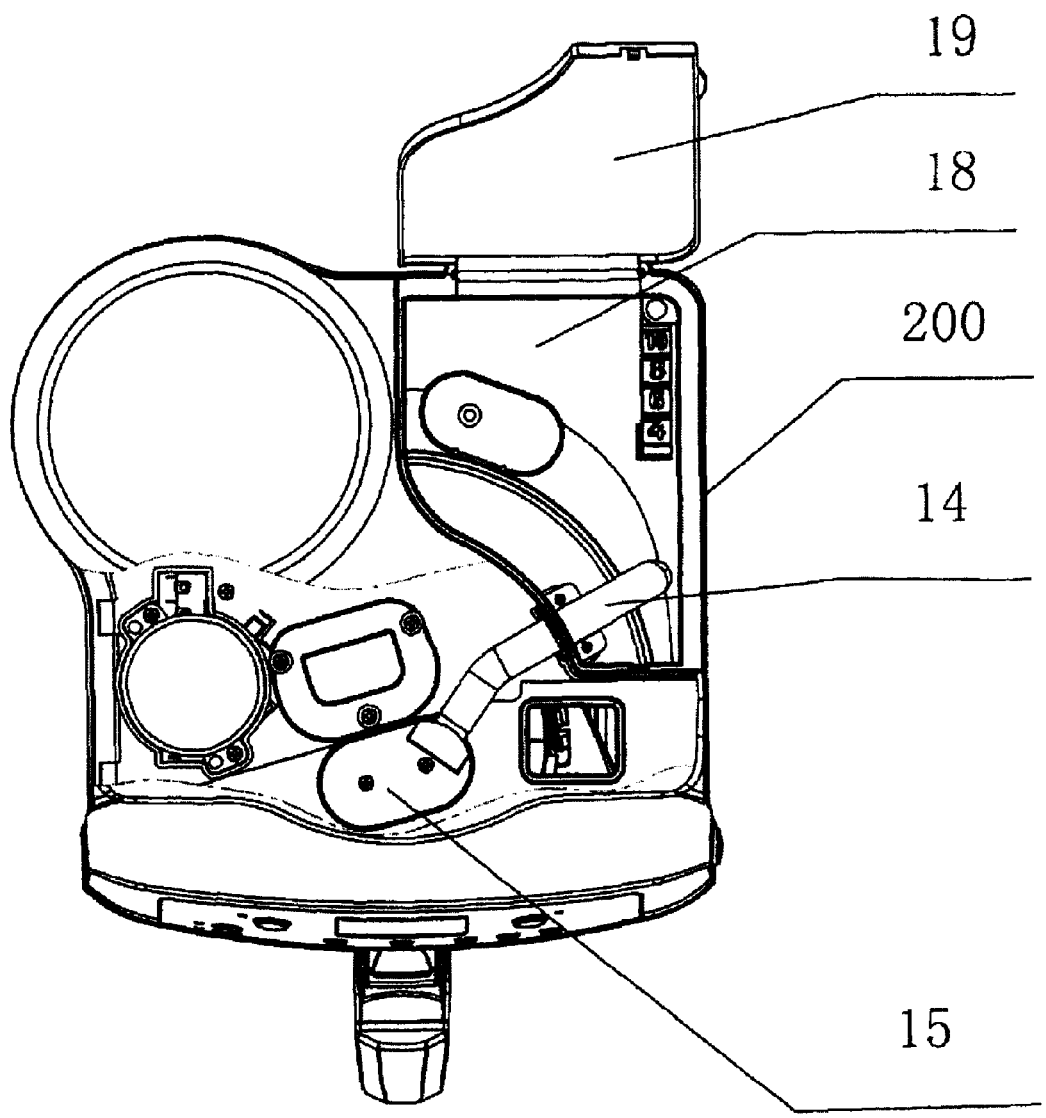
FIG. 14 is a schematic view showing the water loop through the water reservoir of the full-automatic drip coffee maker with coffee bean grinder of the present invention.

As illustrated in FIG. 14, the water reservoir 18 can be disposed on the left, right or rear side of the shell body 200, the cover 19 of the water reservoir 18 can be disposed in way of flip-opening or pull-out opening, the water outgoing pipe and water incoming pipe 14 which are connected with the water reservoir 18 can be hidden inside the water reservoir 18 or outside the water reservoir 18, the heater can be disposed at the bottom of the shell body 200 or on the side of the shell body 200, the spray device 15 can be disposed in front of the coffee powder outlet 5 or at the rear of the coffee powder outlet 5 or surrounding the coffee powder outlet 5. The water reservoir is mainly used for reserving water; water can be added into the water reservoir 18 by opening the cover 19 of the water reservoir 18, then the water in the water reservoir 18 is transferred via the water outgoing pipe to be heated by the heater so as to reach a certain temperature and pressure and then transferred via the water incoming pipe 14 to the spray device 15 so as to spray the coffee in the coffee basket 9.

The above descriptions and illustrations should not be construed as limiting the scope of the present invention, which is defined by the appended claims. Various modifications, alternative constructions and equivalents made by technicians of the field may be employed without departing from the true, spirit and scope of the present invention.

What is claimed is:

1. A full-automatic drip coffee maker with coffee bean grinder comprising a shell body (200) having a left side, a right side, a rear side and a bottom, an automatic coffee bean grinding device (100) which is disposed on the shell body (200), a brewing device which is in connection with the automatic coffee bean grinding device (100), a water reservoir (18), a heater, a control panel (300) which is disposed on the outside of the shell body (200), and a coffee pot (400) for holding coffee which is disposed partly or totally inside the shell body (200) and can be put in and out easily; a coffee powder outlet (5) is disposed below the automatic coffee bean grinding device (100), the brewing device comprises a coffee basket (9) for holding coffee powder, the coffee basket (9) is disposed below the coffee powder outlet (5), and the coffee pot (400) is disposed below a coffee outlet of the brewing device; wherein, the automatic coffee bean grinding device (100) further comprises a partition sealing assembly, and the partition sealing assembly comprises a partition device disposed below the coffee powder outlet (5), a grinding switch (2) which can start the automatic coffee bean grinding device, and a brewing switch (3) which can start the brewing device, and a drive motor (20) for the partition device; the partition device is connected with a shaft of the drive motor (20) so as to rotate around the shaft of the drive motor; the partition device comprises a shift part and a partition part, the grinding switch (2) and the brewing switch (3) are respectively disposed on two sides of the shift part of the partition device; the partition device has two working positions: when the partition device is at a first working position, the coffee powder outlet (5) is not covered by the partition device so that the coffee powder outlet (5) communicates with the coffee basket (9), and the shift part of the partition device is connected with the grinding switch (2) so as to start the automatic coffee bean grinding device; and when the partition device is at a second working position, the partition device rests against and right beneath the coffee powder outlet (5) so that the coffee powder outlet (5) is barriered from the coffee basket (9), and the shift part of the partition device is connected with the brewing switch (3) so as to start the brewing device.

2. The coffee maker according to claim 1, wherein an upper sealing ring (6) is disposed in a clearance formed between the partition device and the coffee powder outlet (5).

3. The coffee maker according to claim 2, wherein a lower sealing ring (7) is disposed in a clearance formed between the partition device and the coffee basket (9).

4. The coffee maker according to claim 3, wherein the partition device consists of an upper part and a lower part; the upper part forms a shift member (10) which is used for turning on and off the grinding switch (2) and the brewing switch (3), the lower part forms a partition plate (11) which is used for opening and closing the coffee powder outlet, and said shift member (10) and partition plate (11) are two independent parts which are detachable from each other.

5. The coffee maker according to claim 4, wherein the shift member (10) of the partition device comprises two ear-shaped bulges which are used for contacting, the grinding switch (2) and the brewing switch (3), the partition plate (11) is a flat plate and has a knife-shaped orthographic projection as viewed from up to down; an assembling plate (30) is disposed between the coffee powder outlet (5) and the coffee basket (9), the grinding switch (2), the brewing switch (3) and the shift member (10) of the partition device are assembled on the upper surface of the assembling plate (30); the partition plate (11) of the partition device is assembled on the lower surface of the assembling plate (30); the shift member (10) of the partition device and the partition plate (11) of the partition device are connected integrally by a sleeve passing through the assembling plate (30); the shift member (10) of the partition device has a central through hole, and the shaft of the drive motor for the partition device is inserted into the central through hole of the shift member (10) of the partition device.

6. The coffee maker according to claim 5, wherein the assembling plate (30) has a through hole which conforms to the coffee powder outlet (5) in shape and size, and the coffee powder outlet (5) passes through the assembling plate (30) to be fastened with the upper sealing ring (6).

7. The coffee maker according to claim 4, wherein, the grinding switch (2) is normally closed; and the brewing switch (3) is normally closed.

8. The coffee maker according to claim 4, wherein said coffee maker further comprises a cover (19) of the water reservoir (18), a water outgoing pipe and a water incoming pipe (14) which are connected with said water reservoir (18) respectively, and a spray device (15); wherein the water reservoir (18) is disposed on one of the sides of the shell body (200), and wherein the cover (19) of the water reservoir (18) is configured to be a flip-opening cover or a pull-out opening cover, and further wherein the water outgoing pipe and water incoming pipe (14) which are connected with the water reservoir (18) are hidden.

9. The coffee maker according to claim 8 wherein the coffee powder outlet (5) comprises a front and a rear, said spray device (15) disposed in the front of the coffee powder outlet (5), at the rear of the coffee powder outlet (5), or surrounding the coffee powder outlet (5).

10. The coffee maker according to claim 3, wherein the partition device is an integral plate having a left side and a right side, wherein the left side of the partition device is a shift section (102) which is used for turning on and off the grinding switch (2), the brewing switch (3), and the right side of the partition device is a partition section (112) which is used for opening and closing the coffee powder outlet.

11. The coffee maker according to claim 10, wherein an assembling plate (30) is disposed between the coffee powder outlet (5) and the coffee basket (9), the grinding switch (2), the brewing switch (3) and the partition device are respectively assembled on the upper surface of the assembling plate (30); the shift section (102) of the partition device has a central through hole, and the shaft of the drive motor for the partition device is inserted into the central through hole of the shift section (102) of the partition device; the assembling plate 30 has a through hole which conforms to the coffee powder outlet (5) in shape and size, and the coffee powder outlet (5) passes through the upper sealing ring (6) and the assembling plate (30) to be fastened with the lower scaling ring (7).

12. The coffee maker according to claim 10, wherein the grinding switch (2) is normally closed; and the brewing switch (3) is normally closed.

13. The coffee maker according to claim 10, wherein said coffee maker further comprises a cover (19) of the water reservoir (18), a water outgoing pipe and a water incoming pipe (14) which are connected with said water reservoir (18) respectively, and a spray device (15); wherein the water reservoir (18) is disposed on one of the sides of the shell body (200), and wherein the cover (19) of the water reservoir (18) is configured to be a flip-opening cover or a pull-out opening cover, and further wherein the water outgoing pipe and water incoming pipe (14) which are connected with the water reservoir (18) are hidden.

14. The coffee maker according to claim 13 wherein the coffee powder outlet (5) comprises a front and a rear, said spray device (15) disposed in the front of the coffee powder outlet (5), at the rear of the coffee powder outlet (5), or surrounding the coffee powder outlet (5).

15. The coffee maker according to claim 1, wherein, the grinding switch (2) is normally closed; and the brewing switch (3) is normally closed.

16. The coffee maker according to claim 1, wherein said coffee maker further comprises a cover (19) of the water reservoir (18), a water outgoing pipe and a water incoming pipe (14) which are connected with said water reservoir (18) respectively, and a spray device (15); wherein the water reservoir (18) is disposed on one of the sides of the shell body (200), and wherein the cover (19) of the water reservoir (18) is configured to be a flip-opening cover or a pull-out opening cover, and further wherein the water outgoing pipe and water incoming pipe (14) which are connected with the water reservoir (18) are hidden.

17. The coffee maker according to claim 16 wherein the coffee powder outlet (5) comprises a front and a rear, said spray device (15) disposed in the front of the coffee powder outlet (5), at the rear of the coffee powder outlet (5), or surrounding the coffee powder outlet (5).

18. The coffee maker according to claim 1 wherein the heater is disposed at the bottom of the shell body (200) or on any of the sides of the shell body (200).

* * * * *